United States Patent
O'Bleness et al.

(10) Patent No.: US 8,135,916 B1
(45) Date of Patent: Mar. 13, 2012

(54) METHOD AND APPARATUS FOR HARDWARE-CONFIGURABLE MULTI-POLICY COHERENCE PROTOCOL

(75) Inventors: R. Frank O'Bleness, Tempe, AZ (US); Sujat Jamil, Gilbert, AZ (US); David E. Miner, Chandler, AZ (US); Joseph Delgross, Chandler, AZ (US); Tom Hameenanttila, Phoenix, AZ (US); Jeffrey Kehl, Chandler, AZ (US)

(73) Assignee: Marvell International Ltd. (BM)

( * ) Notice: Subject to any disclaimer, the term of this patent is extended or adjusted under 35 U.S.C. 154(b) by 379 days.

(21) Appl. No.: 12/416,359

(22) Filed: Apr. 1, 2009

Related U.S. Application Data (60) Provisional application No. 61/047,966, filed on Apr. 25, 2008.

(51) Int. Cl.
G06F 13/00 (2006.01)
G06F 13/28 (2006.01)

(52) U.S. Cl. ......... 711/141; 711/143; 711/144; 711/145

(58) Field of Classification Search .................. 711/141, 711/143, 144, 145
See application file for complete search history.

(56) References Cited

U.S. PATENT DOCUMENTS

| | | | |
|---|---|---|---|
| 5,717,898 A * | 2/1998 | Kagan et al. .................. 711/145 |
| 2005/0251631 A1* | 11/2005 | Rowlands et al. ............. 711/145 |
| 2006/0004942 A1* | 1/2006 | Hetherington et al. .......... 711/3 |

* cited by examiner

Primary Examiner — Hoai V Ho
Assistant Examiner — Tri Hoang (57) ABSTRACT

A processor includes a first level of cache memory and a first set of instructions configured to implement a first cache coherency protocol. The processor also includes a second set of instructions configured to implement a second cache coherency protocol and a cache coherency protocol selector having at least two choice-states. The processor further includes a cache coherency implementer configured to implement the first cache coherency protocol or the second cache coherency with respect to the first level of cache memory based on a selected choice-state of the cache coherency protocol selector.

11 Claims, 8 Drawing Sheets

METHOD AND APPARATUS FOR HARDWARE-CONFIGURABLE MULTI-POLICY COHERENCE PROTOCOL

CROSS-REFERENCE TO RELATED APPLICATIONS

This application claims priority from U.S. Provisional Patent Application No. 61/047,966, filed on Apr. 25, 2008, and entitled "A Configurable Method to Support Multiple Coherence Policies within the Same Processor," the entirety of which is incorporated herein by reference.

FIELD

The technology described in this patent document relates generally to memory management and more specifically to memory coherence protocol management.

BACKGROUND

Memory coherence is an issue that affects the design of computer systems in which one or more processors share a common area of memory with one or more processors or input/output (I/O) peripheral agents accessing that area of memory. A computer system does useful work, for example, by reading data from permanent storage into memory, performing some operation on that data, such as adding two numbers, and then storing the result back to permanent storage. In a uniprocessor system, there is only one processor functioning, and therefore, only one processor that can read or write data values back to permanent storage. Moreover, a simple uniprocessor may only do one thing at a time. Thus, in a uniprocessor system, when a value in memory is changed, all subsequent read operations may see the updated value.

In multiprocessor systems, or in a uniprocessor system where there are I/O agents that can independently access memory, there is the possibility that multiple processors, or a processor and an I/O agent, may need to process the same data value at the same time. Provided that the data value is not updated, copies of the data value may be shared indefinitely.

The problem of maintaining memory coherence is introduced by local caches. A cache is a collection of data that duplicates original values stored elsewhere or computed earlier, where the original data is expensive to fetch or to compute, compared to the cost of reading the cache. In other words, a cache is a temporary storage area where frequently accessed data can be stored for rapid access. For example, a processor may contain a small on-chip cache where the processor temporarily stores data for immediate use and a larger off-chip cache for storing other short-term data. Once a processor updates its local cache copy of shared data, the other processors or I/O will be working with an out-of-date copy. Thus, some scheme is required to notify all processors of changes to shared values. Such a scheme is known as a cache coherence protocol.

Cache coherency refers to the integrity of data stored in local caches of shared resources. When clients in a system maintain caches of a common memory resource, problems may arise with inconsistent data. This is particularly true of processors in a multiprocessing system. For example, if a first client has a copy of a memory block from a previous read, and a second client changes that memory block, the first client may be left with an invalid cache of memory without notification of the change. A cache coherence protocol may be implemented to manage such conflicts and maintain consistency between cache and memory. Where there are multiple levels of caches—e.g. L1, L2 etc. levels of cache—a cache coherence protocol is associated with each cache level, which may be different at each level, and there are interactions between the policies among the adjacent levels.

Figure 1:
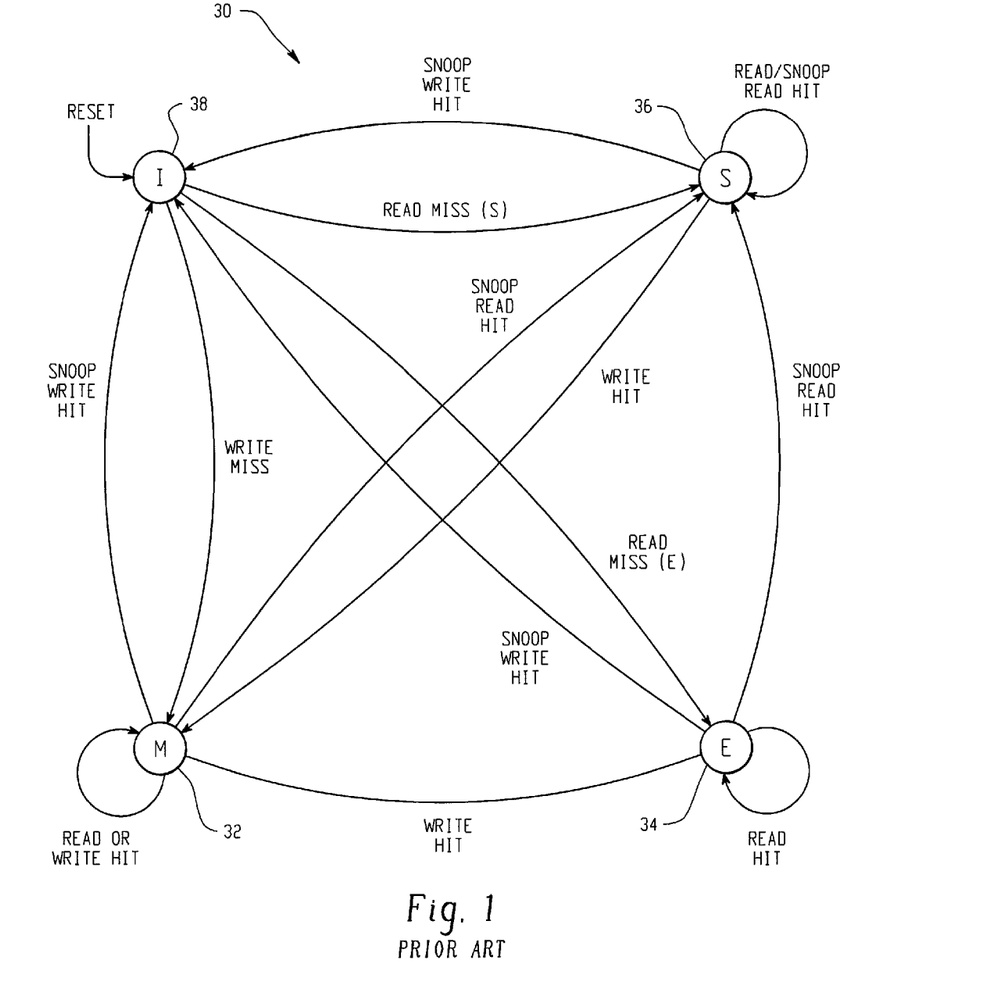
FIG. 1 depicts a Modified-Exclusive-Shared-Invalid (MESI) memory coherence protocol state machine.

FIG. 1 depicts a Modified-Exclusive-Shared-Invalid (MESI) memory coherence protocol state machine 30. In the MESI coherence protocol, cache or memory lines are marked as being in one of four states: Modified, Exclusive, Shared, and Invalid. Each of these states is associated with certain rules for reading, modifying, and writing-back to memory data contained in the associated line. The MESI memory coherence protocol state machine 30 identifies the progression of line-state identifiers as different local actions are taken with respect to a data line and different actions by other entities in the shared resource network are detected or snooped. The meanings of the four MESI states are as follows: the modified state 32 means that the data in the respective line is modified from the version stored in a higher level memory, such as a higher level cache, main memory, or permanent memory; the exclusive state 34 denotes that the data copy on the respective line is held exclusively by the local resource and has not been modified (e.g. data is 'clean'); the shared state 36 identifies that data in the associated data line is being shared by other resources; and the invalid state 38 notes that the respective data line is invalid and should not be utilized for further calculations without refreshing. The modified and exclusive states carry the right-to-modify, so that modifications can be made without any notification to a higher level cache or memory. The shared state does not carry the right-to-modify, so modification rights must be obtained from a higher level cache or memory to transition to an exclusive or modified state.

Figure 2:
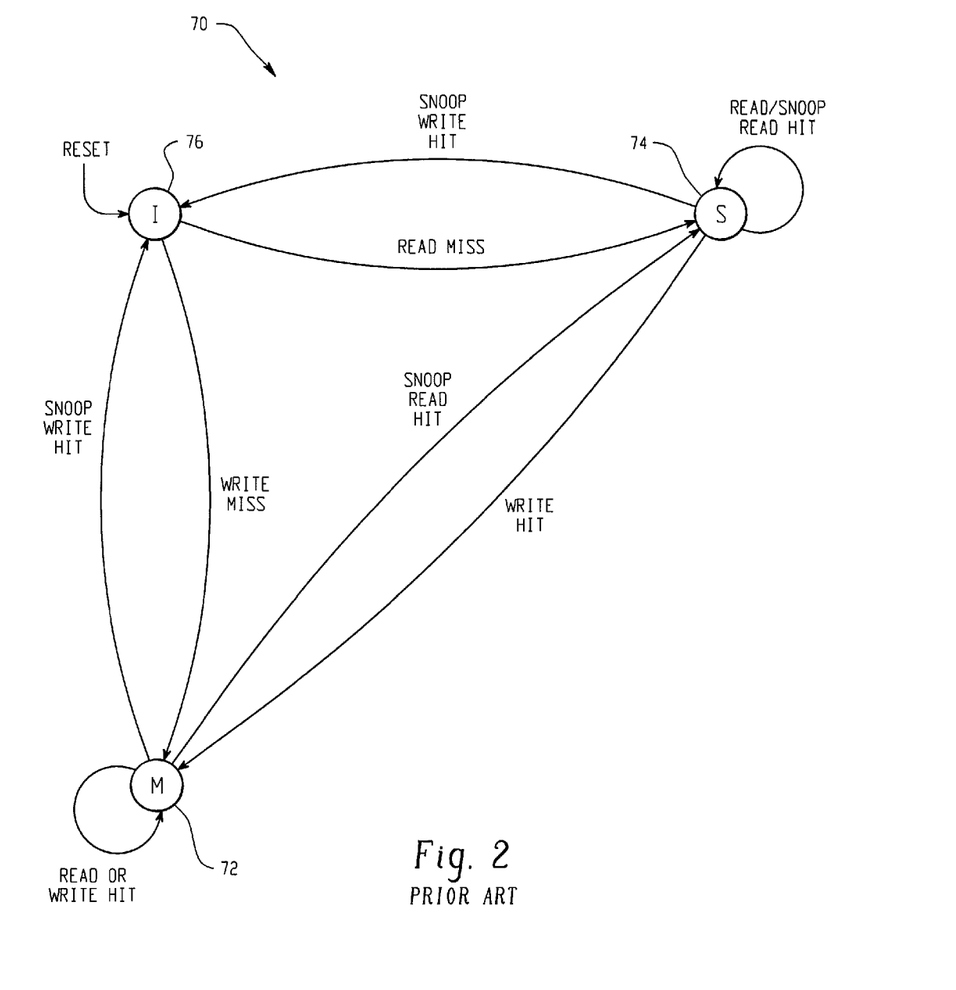
FIG. 2 depicts a Modified-Shared-Invalid (MSI) memory coherence protocol state machine.

In addition to the MESI protocol, several other coherence protocols have been developed. The Modified-Shared-Invalid (MSI) memory coherence protocol is a simplified form of the MESI protocol that does not include the exclusive state. FIG. 2 depicts a Modified-Shared-Invalid (MSI) memory coherence protocol state machine 70. The MSI memory coherence protocol state machine identifies transitions among the modified state 72, the shared state 74, and the invalid state 76. Other memory coherence protocols include: the Modified-Owned-Shared-Invalid (MOSI) protocol; the Modified-Owned-Exclusive-Shared-Invalid (MOESI) protocol; the Write-once protocol; the Synapse protocol; the Berkeley protocol; the Illinois protocol; the Firefly protocol; and the Dragon protocol.

SUMMARY

In accordance with the teachings provided herein, systems and methods are provided that may include a processor having a first level of cache memory and a first set of instructions configured to implement a first cache coherency protocol. The processor may also include a second set of instructions configured to implement a second cache coherency protocol and a cache coherency protocol selector having at least two choice-states. The processor may further include a cache coherency implementer configured to implement the first cache coherency protocol or the second cache coherency with respect to the first level of cache memory based on a selected choice-state of the cache coherency protocol selector.

As an additional example, a system may include a main memory and a processor. The processor may include a first level of cache memory and a first set of instructions configured to implement a Modified-Exclusive-Shared-Invalid (MESI) protocol. The processor may further include a second set of instructions configured to implement a Modified- Shared-Invalid (MSI) protocol and a cache coherency protocol selector having at least two choice-states. The processor may further include a cache coherency implementer configured to implement the first cache coherency protocol or the second cache coherency protocol with respect to the first level of cache memory based on a selected choice-state of the cache coherency protocol selector.

As a further example, a method of initializing a processor may include receiving a power-on signal at the processor and examining a cache coherency protocol selector choice-state. A first cache coherency protocol may be implemented with respect to a first level of cache memory if the cache coherency protocol selector is in a first choice-state, and a second cache coherency protocol may be implemented with respect to the first level of cache memory if the cache coherency protocol selector is in a second choice-state. The remainder of the boot routine may be performed following implementation of a cache coherency protocol.

DETAILED DESCRIPTION

Different memory coherence protocols introduce different mechanisms for maintaining proper memory consistencies across a plurality of memory entities, such as protocol specific instructions and/or hardware. Each of these protocols contains inherent strengths and weaknesses that may dictate the selection of one coherence protocol over another based on the application. For example, the MESI protocol offers a robust framework for managing data coherency. However, use of the protocol may require more intensive resources to handle certain memory scenarios than other coherence protocols. For example, in a multiprocessor system containing a processor responsive to a level 1 (L1) cache, a level 2 (L2) cache, and a main memory, special care may need to be taken when a processor takes data in an exclusive state and holds that data in the exclusive state in lines in both its L1 and L2 caches. If the data held in the L2 cache is modified without notifying the L1 cache, the L1 cache may perform computations with the L1 cache copy of the data, not knowing that the L1 copy is invalid following the L2 cache modification. As an additional example, when an L1 cache modifies its copy of data without notifying the L2 cache, the L2 cache may subsequently respond incorrectly to requests from other processors in the MP system (e.g. to snoops). Additionally, the L2 cache may overwrite the more recent L1 data if both copies of data are evicted at the same time (e.g. older L2 data must write to memory before younger, more-modified L1 data). Thus, extra control resources and instructions may be associated with the MESI protocol to avoid this and other erroneous memory scenarios.

The MSI memory coherence protocol offers a somewhat simpler construct for handling memory coherence through the elimination of the exclusive memory line state. In exchange for this simplicity, the MSI protocol offers a less robust framework for handling memory coherence that may give up some features of the more complicated MESI protocol. For example, the above described processor could not take data in the exclusive state into its L1 cache and L2 cache. Instead, the processor would take copies of the data in the shared state into its L1 cache and L2 cache. Upon making a modification to the data in the L2 cache, the processor would know that it needs to inform other levels of memory and other resources of the modification to the data based on the shared status of the data line. Additionally, the lower-level L1 cache would know it should inform the higher-level L2 cache that it wants to make modifications to shared-data. Thus, the elimination of the exclusive state avoids the above described issue when an MSI protocol is used. However, use of the MSI protocol eliminates the availability of features associated with the exclusive state.

Figure 3:
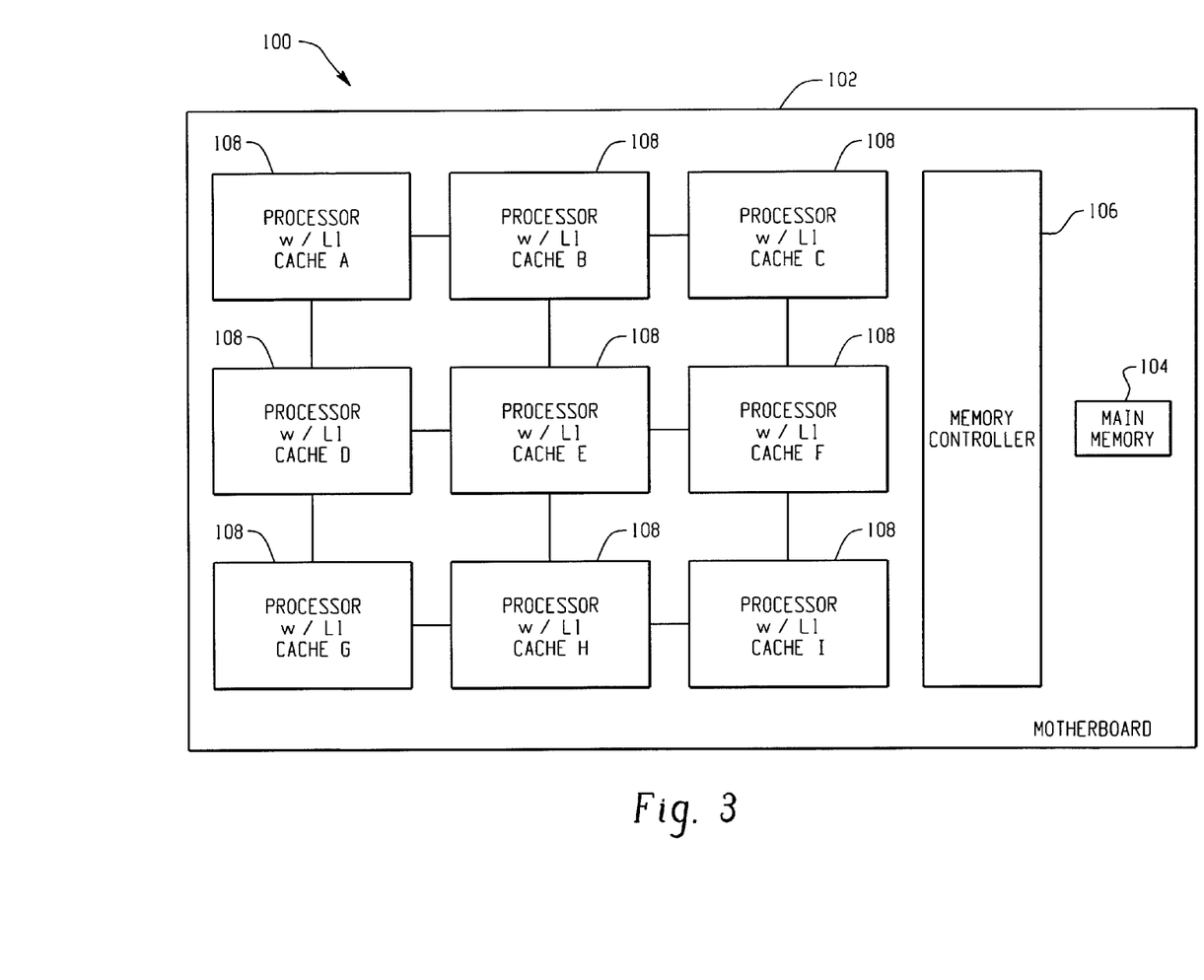
FIG. 3 depicts a block diagram of a multiprocessor architecture.

FIG. 3 depicts a block diagram of a multiprocessor architecture 100 that may be conducive to use of the MESI protocol. FIG. 3 depicts a motherboard 102 containing a main memory 104 that is responsive to a memory controller 106. Responsive to the main memory 104 and the memory controller 106 are an interconnected array of 9 processors 108 labeled A-G, each of which contains an on-chip L1 cache. The multiprocessor configuration of FIG. 3 may be useful in high-powered computing scenarios where very-large, difficult problems are solved by the array of processors 108. In such a scenario, there may be a large amount of data reads from memory and data transfers among the processors 108 to facilitate the complex computation requirements. In such a system, it may be desirable to implement a robust memory coherence protocol in the L1 cache on each of the processors to better enable high-speed complex memory manipulations. Thus, in this configuration, selection of a processor implementing a MESI protocol may be a good choice.

Figure 4:
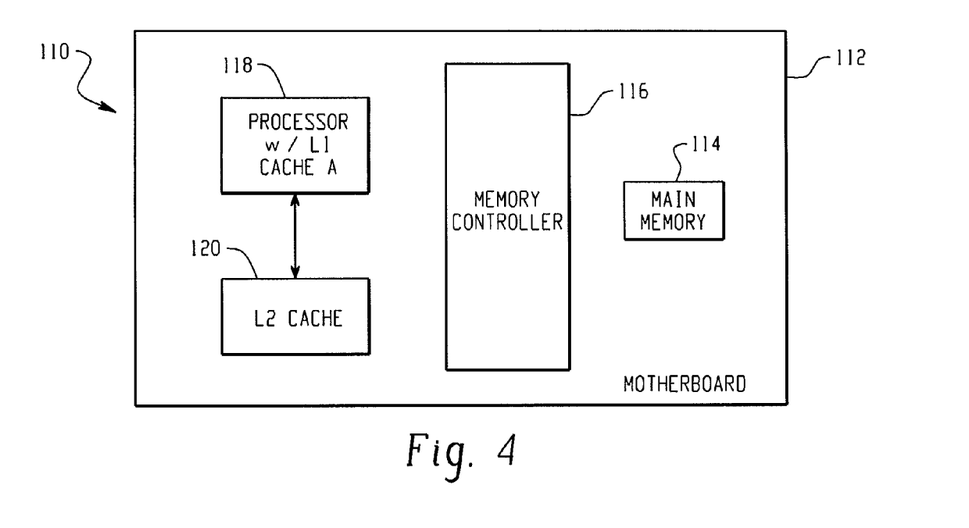
FIG. 4 depicts a block diagram of a single processor architecture having a coherent level two (L2) cache.

FIG. 4 depicts a block diagram of a single processor architecture 110 having a coherent L2 cache that may be conducive to selection of the MSI protocol. FIG. 4 depicts a motherboard 112 containing a main memory 114 that is responsive to a memory controller 116. A processor 118 containing an on-chip L1 cache is responsive to the main memory 114 and the memory controller 116. The motherboard 112 also contains an L2 cache 120 located in close proximity to the processor 118 enabling fast access to needed data. As noted above, certain complications may arise in MESI protocol implementations, such as when a resource takes data in an exclusive state and maintains a copy of that exclusive-state data in multiple levels of cache. To avoid these complications, during architecture design, it may be deemed desirable to implement the L1 cache contained in the processor 118 and the L2 cache 120 using the simplified MSI protocol to avoid having to expend resources on avoiding certain erroneous memory states. The L2 cache 120 may utilize the same or a different protocol as the L1 cache contained in the processor 118 according to system design preferences.

Traditionally, a memory coherence policy is hardwired into a resource through the incorporation of instructions and/or hardware that is specific to the selected coherence policy. Thus, the decision as to what memory coherence protocol is to be used in a resource is usually a decision made at the design time of the resource. For example, to implement the configuration shown in FIG. 3 using the MESI protocol, processors would be designed that contain instructions and/or optimized hardware for implementing the MESI protocol, or a previously designed processor that implement the MESI protocol would be selected for use in the array of processors 108. As another example, if the configuration of FIG. 4 were desired where the L2 cache was to implement the MESI protocol and the L1 was to implement the MSI protocol, then an MSI processor would be designed or selected for use as the processor 118, and an MESI L2 cache would be designed or selected for use as the L2 cache 120.

The requirement of selecting a memory coherence protocol specific resource, such as a processor, to meet the needs of a selected architecture may often limit flexibility and increase cost. For example, an existing processor may contain many desired features. However, if the processor is built upon an undesirable memory coherence protocol, then a system designer may be forced to: not use the processor; design and build a new processor; or implement a suboptimal memory coherence scheme. To alleviate this problem, it may often be desirable to have resources available that are programmable to implement one of a plurality of memory coherence protocols. Such a system would contain instructions and/or hardware for implementing two or more of the variety of available memory coherence protocols that are selectable.

Figure 5:
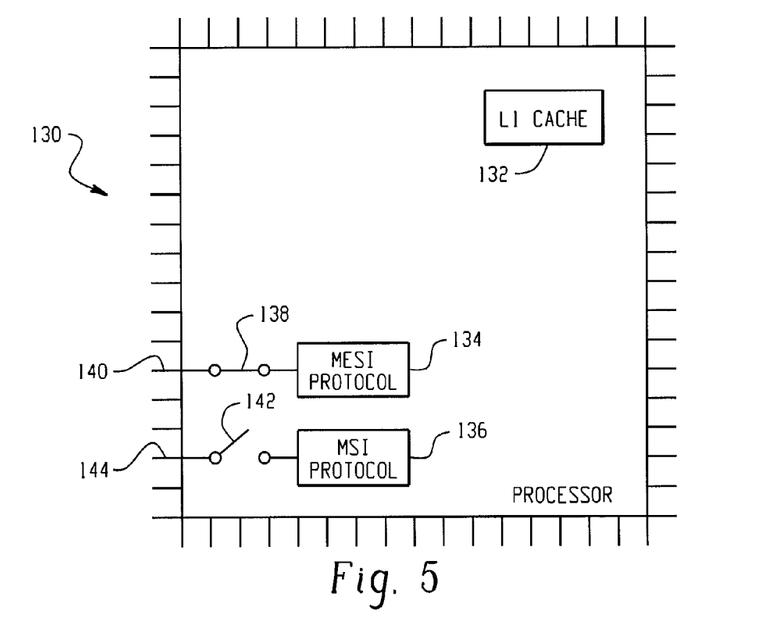
FIG. 5 depicts a processor containing instructions for a MESI and an MSI memory coherence protocol selectable by fuses.

FIG. 5 depicts a processor 130 containing instructions for a MESI coherence protocol 134 and an MSI memory coherence protocol 136 selectable by a plurality of fuses 138, 142. The processor 130 contains an L1 cache 132 that may be implemented according to either the MESI protocol 134 or the MSI protocol 136 depending on the states of the cache coherency protocol selector fuses 138, 142. For example, if the MESI fuse 138, controlled by a processor pin 140, is intact, and the MSI fuse 142, controlled by a second processor pin 144, is blown, then the MESI protocol 134 is implemented in the L1 cache 132. Alternatively, if the MSI fuse 142 is intact, and the MESI fuse 138 is blown, then the MSI protocol 136 is implemented in the L1 cache.

It should be noted that the selection of a protocol may be implemented using a variety of configurations of one or more fuses (e.g., a blown fuse may select a memory coherence protocol, and an intact fuse may disable the associated protocol) or through the use of another cache-coherency protocol selector mechanism, and the selection pool of protocols may include two or more memory coherence protocols. The setting of fuse choice-states 138, 142 may be a permanent selection done at manufacture, or it may be a reversible procedure that may allow modification of the memory coherence protocol selection.

Figure 6:
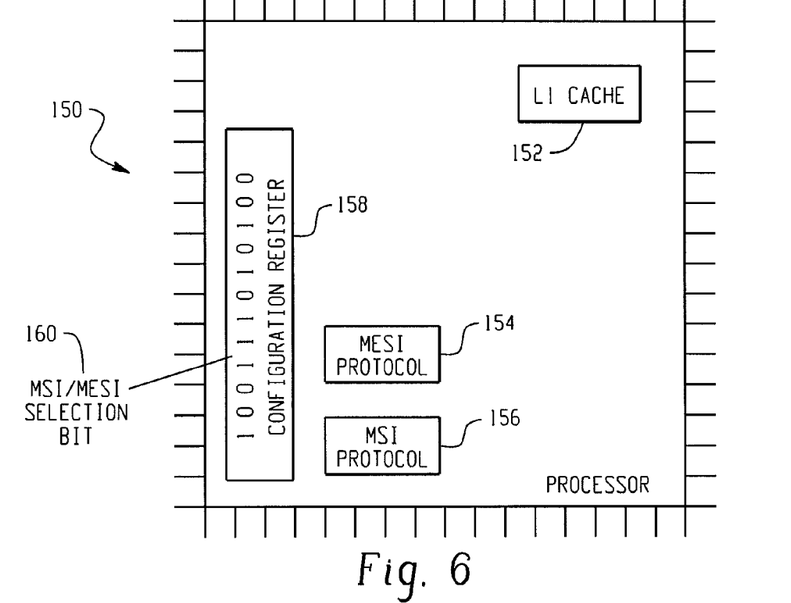
FIG. 6 depicts a processor containing instructions for a MESI and an MSI memory coherence protocol selectable by a configuration register.

FIG. 6 depicts a second example processor 150 containing instructions for a MESI coherence protocol 154 and an MSI memory coherence protocol 156 selectable by a configuration register 158. The processor 150 contains an L1 cache 152 that may be implemented according to either the MESI protocol 154 or the MSI protocol 156 depending on the state of one or more bits in the configuration register 158. In the example of FIG. 6, the fifth bit of the configuration register 158 is the MSI/MESI selection bit 160. Thus, when the fifth bit of the configuration register 158 is a '1', then the MSI protocol is implemented, and when the fifth bit of the configuration register 158 is a '0', then the MESI protocol is implemented in the L1 cache. For example, a value could be loaded into the configuration register 158 at startup instructing the processor 150 as to which memory coherence protocol to implement during the current processor run. It should be noted that the specific bit and/or the number of bits controlling memory coherence protocol selection may vary according to design preferences. Additionally, the selection pool of protocols may include two or more memory coherence protocols. Additional variations include the use of one or more bits contained in a read-only-memory for memory coherence protocol selection.

The ability to utilize a non-memory-coherence-protocol-specific resource may enable an increase in flexibility and reduction in cost in architecture development. For example, the ability to select an off-the-shelf processor that may be programmed to implement a desired memory coherence protocol may enable utilization of a resource having desired features without concern for the memory coherence protocol for which the resource was designed. This may reduce costs by alleviating the need to design a resource containing the desired features if a general purpose, memory coherence protocol-programmable resource is available.

Figure 7:
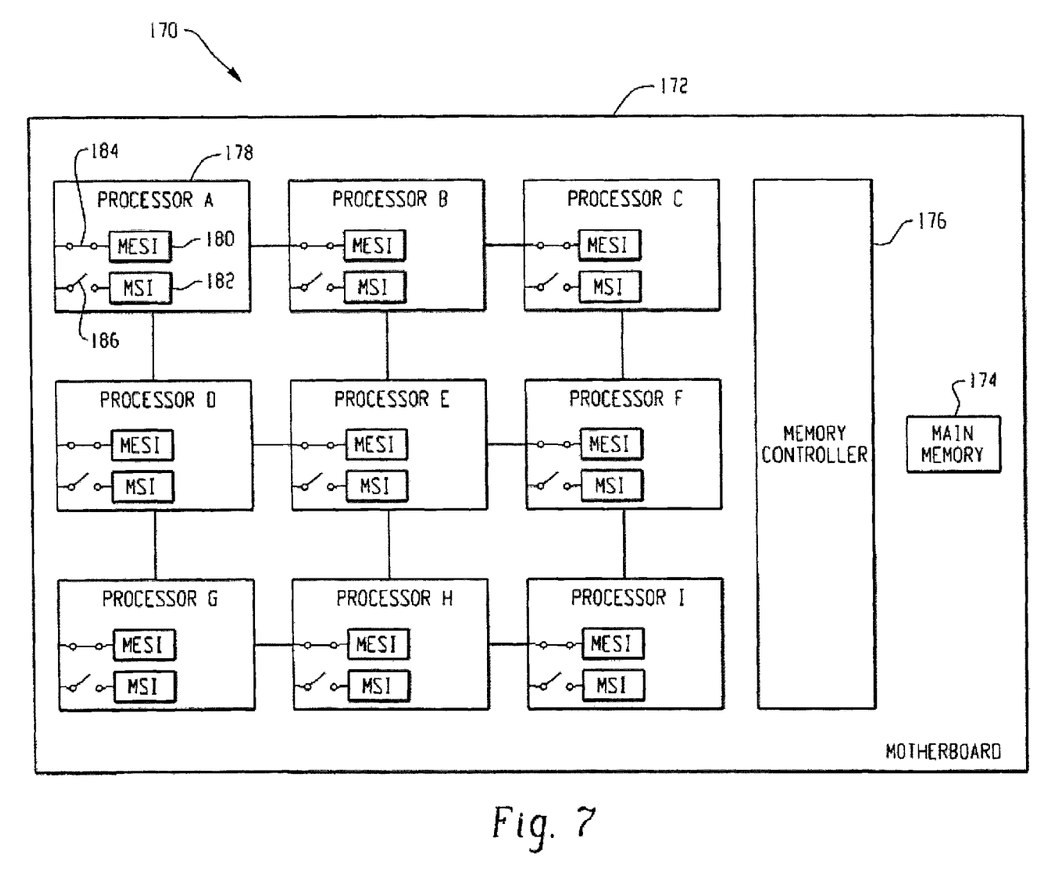
FIG. 7 depicts a block diagram of a multiprocessor architecture having fuse-selectable memory coherence protocol instructions.

FIG. 7 depicts a block diagram of an example multiprocessor architecture 170 including processors 178 having an on-chip L1 cache and fuse-selectable memory coherence protocol instructions. The architecture 170 is housed on a motherboard 172 that contains a main memory 174 and a memory controller 176. The architecture 170 also contains an array of connected processors 178 that may be useful for performing large scale calculations in concert with one another. As discussed above with reference to FIG. 3, it may be desirable to utilize processors configured for the MESI protocol in this processor array architecture. The example architecture of FIG. 7 utilizes a plurality of processors 178, each of which contains instructions and/or hardware for implementing both the MESI 180 and MSI 182 memory coherence protocols. In this implementation, two fuses 184, 186 control selection of the memory coherence protocol. These fuses may be set at a variety of different times including at the manufacturer, during fabrication, at system startup, etc. As illustrated in FIG. 7, the MESI fuse 184 is intact, and the MSI fuse 186 is blown in each of the processors 178, selecting the MESI memory coherence protocol for the on-chip L1 caches.

Figure 8:
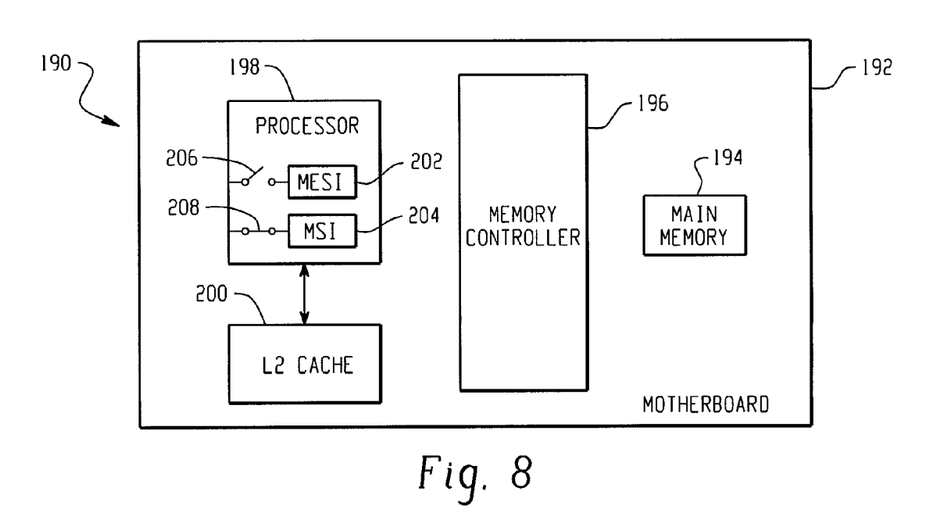
FIG. 8 depicts a block diagram of a single processor architecture having fuse-selectable memory coherence protocol instructions.

FIG. 8 depicts a block diagram of an example single processor architecture 190 including a processor 198 having an on-chip L1 cache and fuse-selectable memory coherence protocol instructions. The architecture 190 is housed on a motherboard 192 that contains a main memory 194 and a memory controller 196. The architecture 190 also contains a single processor 198 containing an on-chip L1 cache that is responsive to an L2 cache. As discussed above with reference to FIG. 4, it may be desirable to utilize a processor configured to utilize the MSI protocol for the on-chip L1 cache in this architecture configuration. The example of FIG. 8 utilizes a single processor 198 containing instructions and/or hardware for implementing both the MESI 202 and MSI 204 memory coherence protocols. In this example, the MESI fuse 206 is blown, and the MSI fuse 208 is intact, selecting the MSI memory coherence protocol for the on-chip L1 cache in the processor 198.

Figure 9:
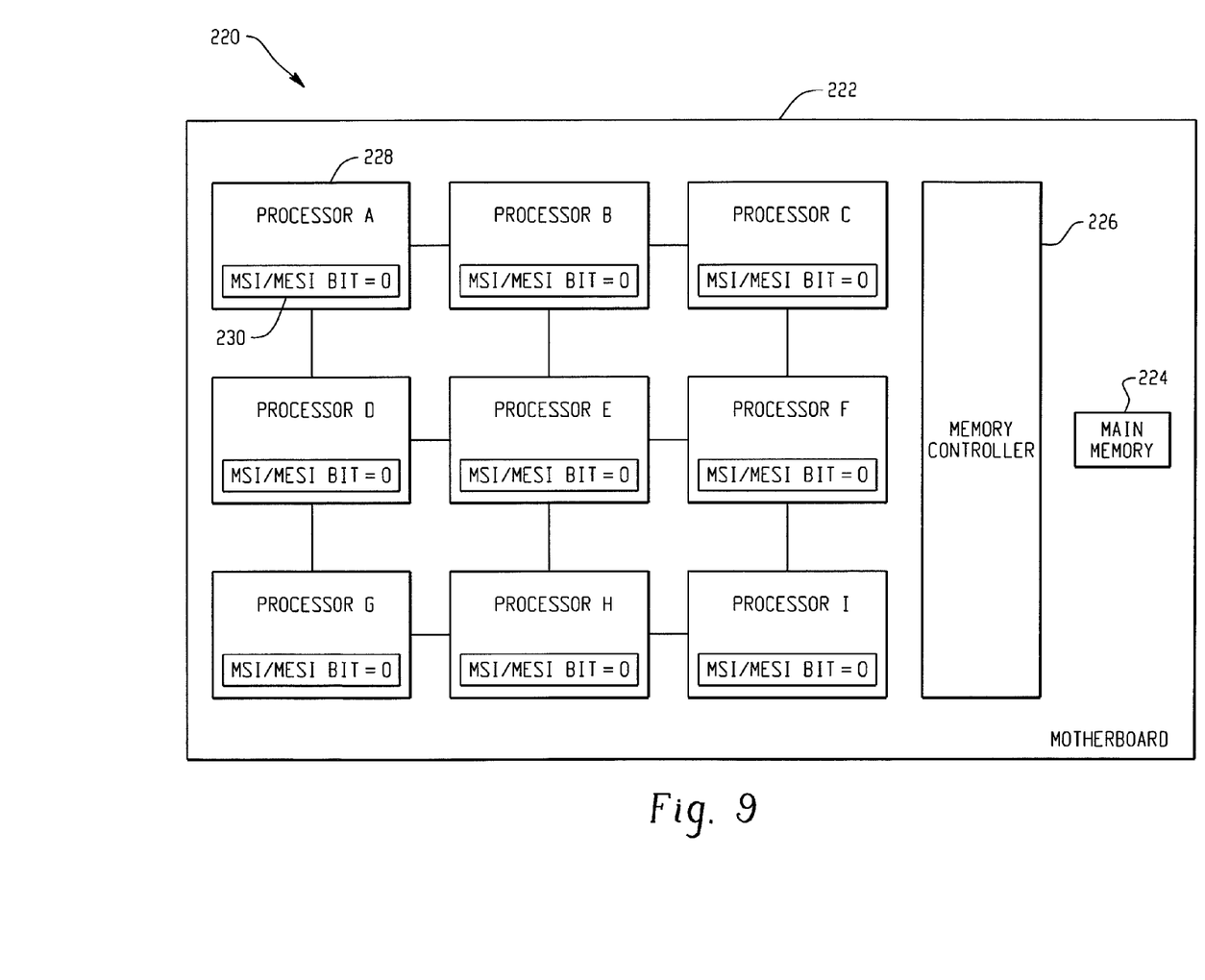
FIG. 9 depicts a block diagram of a multiprocessor architecture having configuration register-selectable memory coherence protocol instructions.

FIG. 9 depicts a block diagram of an example multiprocessor architecture 220 having configuration register-selectable memory coherence protocol instructions. As noted above with respect to FIG. 6, the memory coherence protocol may be selected based on the contents of one or more bits in a configuration register. The multiprocessor architecture 220 of FIG. 9 is housed on a motherboard 222 that contains a main memory 224 that is responsive to a memory controller 226. The architecture 220 also contains an array or processing elements 228, each of which contains an on-chip L1 cache. As noted above with reference to FIG. 3, it may be desirable to utilize processors configured to use the MESI protocol for the on-chip L1 caches in each of the processors 228 in this configuration. To accomplish this configuration, a '0' is placed in the MSI/MESI bit 230 of the configuration register, instructing the processor 228 to implement the instructions and/or hardware associated with the MESI cache coherency protocol for the on-chip L1 cache.

Figure 10:
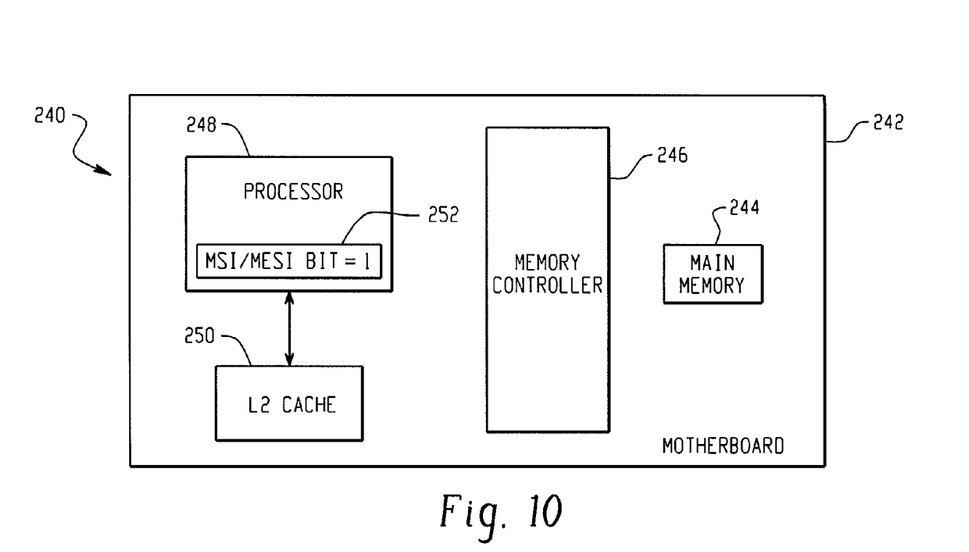
FIG. 10 depicts a block diagram of a single processor architecture having configuration register-selectable memory coherence protocol instructions.

FIG. 10 depicts a block diagram of another example architecture 240 where a single processor 248 containing an on-chip L1 cache contains configuration register-selectable memory coherence protocol instructions. The architecture 240 of FIG. 10 is housed on a motherboard 242 that contains a main memory 244 that is responsive to a memory controller 246. The architecture 240 also contains a single processor 248, which contains an on-chip L1 cache. The processor 248 is also responsive to a nearby L2 cache 250. As noted above with reference to FIG. 4, it may be desirable to utilize a processor 248 configured to use the MSI memory coherence protocol for the on-chip L1 cache to reduce modification conflict resolution requirements with the L2 cache 250. To accomplish this configuration, a '1' is placed in the MSI/MESI bit 252 of the configuration register, instructing the processor 248 to implement the instructions and/or hardware associated with the MSI cache coherency protocol for the L1 cache.

Figure 11:
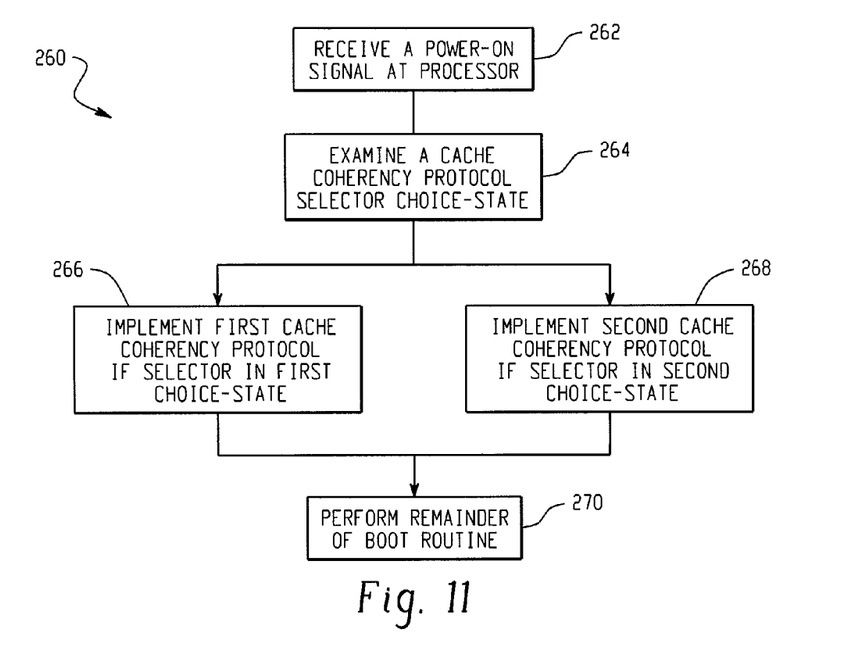
FIG. 11 depicts a flow diagram for initializing a processor to utilize a selected cache coherency protocol.

FIG. 11 depicts a flow diagram 260 for initializing a processor to utilize a selected cache coherency protocol. A power-on signal is received at the processor at 262. In response to receipt of the power-on signal, the choice-state of a cache coherency protocol is examined at 264. A first cache coherency protocol is implemented at 266 with respect to a first level of cache memory if the cache coherency protocol selector is in a first choice-state. A second cache coherency protocol is instead implemented at 268 with respect to a first level of cache memory if the cache coherency protocol selector is in a second choice-state. The processor then performs the remainder of a boot routine following implementation of a cache coherency protocol as shown at 270.

One or more of the steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

This written description uses examples to disclose the invention, including the best mode, and also to enable a person skilled in the art to make and use the invention. It should be noted that the systems and methods described herein may be equally applicable to other configurations. For example, while the examples depicted herein illustrate selection of a memory coherency protocol for use with an on-chip L1 cache in a processor, the disclosed systems and methods may be used in other implementations such as system caches, coherent bridges, snoop filters, etc. In addition, one or more steps of methods described above may be performed in a different order (or concurrently) to achieve desirable results. The patentable scope of the invention may include other examples that occur to those skilled in the art.

It is claimed:

1. A processor comprising:
   a first level of cache memory;
   a first set of instructions configured to implement a first cache coherency protocol;
   a second set of instructions configured to implement a second cache coherency protocol;
   a cache coherency protocol selector having at least two choice-states, the cache coherency protocol selector comprising one or more bits in a configuration register; and
   a cache coherency implementer configured to implement the first cache coherency protocol or the second cache coherency protocol with respect to the first level of cache memory based on a selected choice-state of the cache coherency protocol selector, the first cache coherency protocol being implemented by the cache coherency implementer when a first value appears in the one or more bits in the configuration register, and the second cache coherency protocol being implemented by the cache coherency implementer when a second value appears in the one or more bits in the configuration register.

2. The processor of claim 1, wherein the first cache coherency protocol includes first cache coherency protocol hardware; and
   wherein the second cache coherency protocol includes second cache coherency protocol hardware.

3. The processor of claim 1, wherein the first cache coherency protocol is selected from the group consisting of: Modified-Shared-Invalid (MSI) protocol; Modified-Exclusive-Shared-Invalid (MESI) protocol; Modified-Owned-Shared-Invalid (MOSI) protocol; Modified-Owned-Exclusive-Shared-Invalid (MOESI) protocol; Write-once protocol; Synapse protocol; Berkeley protocol; Illinois protocol; Firefly protocol; and Dragon protocol.

4. The processor of claim 3, wherein the second cache coherency protocol is a different cache coherency protocol from first cache coherency protocol, the second cache coherency protocol being selected from the group consisting of: Modified-Shared-Invalid (MSI) protocol; Modified-Exclusive-Shared-Invalid (MESI) protocol; Modified-Owned-Shared-Invalid (MOSI) protocol; Modified-Owned-Exclusive-Shared-Invalid (MOESI) protocol; Write-once protocol; Synapse protocol; Berkeley protocol; Illinois protocol; Firefly protocol; and Dragon protocol.

5. The processor of claim 1, wherein the cache coherency protocol selector comprises a fuse.

6. The processor of claim 5, wherein the first cache coherency protocol is implemented by the cache coherency implementer in response to the fuse being intact, and the second cache coherency protocol is implemented by the cache coherency implementer in response to the fuse being blown.

7. The processor of claim 1, wherein the one or more bits in the configuration register are set during a boot sequence.

8. A system comprising:
a main memory; and
a processor, the processor comprising:
  a first level of cache memory;
  a first set of instructions configured to implement a Modified-Exclusive-Shared-Invalid (MESI) protocol;
  a second set of instructions configured to implement a Modified-Shared-Invalid (MSI) protocol;
  a cache coherency protocol selector having at least two choice-states, the cache coherency protocol selector of the processor comprising one or more bits in a configuration register; and
  a cache coherency implementer configured to implement the MESI protocol or the MSI protocol with respect to the first level of cache memory based on a selected choice-state of the cache coherency protocol selector.

9. The system of claim 8, further comprising a plurality of additional networked processors, each of the additional networked processors including:
  a first level of cache memory;
  a first set of instructions configured to implement a Modified-Exclusive-Shared-Invalid (MESI) protocol;
  a second set of instructions configured to implement a Modified-Shared-Invalid (MSI) protocol;
  a cache coherency protocol selector having at least two choice-states;
  a cache coherency implementer configured to implement the MESI protocol or the MSI protocol with respect to the first level of cache memory based on a selected choice-state of the cache coherency protocol selector;
  wherein the processor and each of the additional networked processors have their respective cache coherency protocol selector in the MESI protocol choice-state.

10. The system of claim 9, wherein the cache coherency protocol selector of the processor comprises a fuse, and the cache coherency protocol selector of each of the additional processors comprises a fuse.

11. The system of claim 8, further comprising a second level of cache memory; wherein the cache coherency protocol selector is in the MSI protocol choice-state.

* * * * *